United States Patent
Chuang et al.

(10) Patent No.: US 10,241,540 B2
(45) Date of Patent: Mar. 26, 2019

(54) PORTABLE ELECTRONIC DEVICE CAPABLE OF ENHANCING HEAT DISSIPATION

(71) Applicant: Compal Electronics, Inc., Taipei (TW)

(72) Inventors: Wei-Pin Chuang, Taipei (TW); Wei-Che Yang, Taipei (TW); Han-Min Chuang, Taipei (TW); Hsu-Lung Chin, Taipei (TW); Ya-Chu Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 15/593,285

(22) Filed: May 11, 2017

(65) Prior Publication Data

US 2018/0267570 A1    Sep. 20, 2018

(30) Foreign Application Priority Data

Mar. 16, 2017  (TW) .............................. 106108733 A

(51) Int. Cl.
    *G06F 1/16*    (2006.01)
(52) U.S. Cl.
    CPC .......... *G06F 1/1616* (2013.01); *G06F 1/1637* (2013.01); *G06F 1/1662* (2013.01); *G06F 1/1681* (2013.01)
(58) Field of Classification Search
    CPC ...... G06F 1/166; G06F 1/1616; G06F 1/1681; G06F 1/1637; G06F 1/1662
    See application file for complete search history.

(56) References Cited

U.S. PATENT DOCUMENTS

| | | | | |
|---|---|---|---|---|
| 5,552,960 A * | 9/1996 | Nelson | .................... | G06F 1/203 165/104.33 |
| 6,459,573 B1 * | 10/2002 | DiStefano | ............... | G06F 1/203 361/679.46 |
| 6,496,369 B2 * | 12/2002 | Nakamura | ............ | G06F 1/1616 165/80.3 |
| 8,520,382 B2 * | 8/2013 | Tye | ......................... | G06F 1/203 248/685 |
| 2013/0229753 A1 * | 9/2013 | Hsiu | ....................... | G06F 1/166 361/679.01 |
| 2014/0218846 A1 * | 8/2014 | Chang | ................... | G06F 1/1675 361/679.01 |

FOREIGN PATENT DOCUMENTS

TW    I487465    6/2015

* cited by examiner

*Primary Examiner* — James Wu
(74) *Attorney, Agent, or Firm* — Chieh-Mei Wang

(57) ABSTRACT

A portable electronic device includes a host module having a housing with an accommodation space, a display module and a lift structure. The display module is pivotally connected to the housing by a shaft. The lift structure includes a bottom cover covering the accommodation space, a swing member and a follower member. The bottom cover includes an abutment portion including an abutment surface and located on an end surface of the bottom cover adjacent to the accommodation space. The swing member is in the accommodation space and connected to the shaft. The swing member moves with the display module. The follower member connects to the swing member and contacts the abutment surface. The follower member moves in a first direction according to swinging of the swing member, therefore the follower member abuts against the abutment surface and the bottom cover moves in a second direction to lift up the housing.

12 Claims, 9 Drawing Sheets

PORTABLE ELECTRONIC DEVICE CAPABLE OF ENHANCING HEAT DISSIPATION

FIELD OF THE INVENTION

The present invention relates to an electronic device, and more particularly to a portable electronic device.

BACKGROUND OF THE INVENTION

A conventional notebook computer is equipped with components and peripheral devices such as processors, motherboards, memory modules, graphics cards, hard drives, power supplies, displays and keyboards. With the development of science and material innovation, the sizes of components and peripheral devices are reduced, and therefore overall thickness of the housing of a conventional notebook computer is reduced by employing compact-sized components and peripheral devices.

However, to compact the size of the housing, design of a conventional notebook computer may have to sacrifice an inclination of a keyboard that allows the user to operate the notebook computer more comfortably. Therefore, the hands of the user may feel discomfort when the user operates the conventional notebook computer. Moreover, a compact notebook computer also has insufficient internal space, causing the problem of heat dissipation accordingly.

SUMMARY OF THE INVENTION

One objective of the present invention is to provide a portable electronic device, such as a notebook computer, that provides an ergonomic tilt angle to alleviate hand discomfort when the user operates the conventional notebook computer and improve the problem of heat dissipation of a portable electronic device having a compact size.

In order to achieve one or more of the above advantages, an embodiment of the present invention provides a portable electronic device, which includes a host module, a display module and a lift structure. The host module includes a housing. The housing includes an accommodation space. The display module is pivotally connected to the housing by a shaft.

The lift structure includes a bottom cover, a swing member and a follower member. The bottom cover is for covering the accommodation space from the bottom surface of the housing. The bottom cover includes an abutment portion located on a first end surface of the bottom cover adjacent to the accommodation space. The abutment portion includes a first abutment surface. The swing member is disposed in the accommodation space and connected to the shaft. The swing member is moved together with the display module. The follower member is connected to the swing member and contacts the first abutment surface. The follower member is moved in a first direction according to a swinging of the swing member, so that the follower member abuts against the first abutment surface and the bottom cover is moved in a second direction to lift up the housing.

In one embodiment of the present invention, the first abutment surface includes a slope surface and two flat surfaces connected to the slope surface.

In one embodiment of the present invention, a side of the follower member includes a first abutment against surface opposite to the first abutment surface. The first abutment against surface contacts and abuts against the first abutment surface.

In one embodiment of the present invention, the lift structure further includes a foot pad disposed on a second end surface of the bottom cover.

In one embodiment of the present invention, the lift structure further includes a foot pad disposed on the housing. The follower member contacts the foot pad. The follower member is moved in the first direction to drive the foot pad to move in the second direction to lift up the housing.

In one embodiment of the present invention, a side of the foot pad includes a second abutment surface. The second abutment surface includes a slope surface and two flat surfaces connected to the slope surface.

In one embodiment of the present invention, a side of the follower member includes a second abutment against surface opposite to the second abutment surface. The second abutment against surface contacts the second abutment surface.

In one embodiment of the present invention, the swing member includes a guide portion and a swing arm. A first end portion of the guide portion is connected to the shaft. A second end portion of the guide portion is pivotally connected to the swing arm. The guide portion is moved according to a rotation of the display module. The swing arm is swung according to a movement of the guide portion.

In one embodiment of the present invention, the guide portion includes a slot and a stopper member. The slot is located between the first end portion and the second end portion. The stopper member passes through the slot and is fixed to the housing. The slot is moved with respect to the stopper member according to the rotation of the display module.

In one embodiment of the present invention, the swing member further includes a pivot. The pivot is fixed to the housing. The second end portion of the guide portion is pivotally connected to a first end of the swing arm, the follower member is pivotally connected to a second end of the swing arm, and a middle part of the swing arm is pivotally connected to the pivot.

In one embodiment of the present invention, the host module includes a keyboard disposed on an upper surface of the housing.

In one embodiment of the present invention, the bottom cover includes at least one retaining wall extending in the second direction to close a gap between the lifted housing and the bottom cover. The retaining wall includes a grid.

In summary, in the portable electronic device according to an embodiment of the present invention, the follower member of the lift structure is moved in the first direction according to the swinging of the swing member and therefore abuts against the first abutment surface, so that the bottom cover is moved in the second direction to lift up the housing to form an angle conforming with the ergonomics of the user. Therefore, the user's hands can operate the portable electronic device of the present embodiment in an ergonomic manner, and thereby alleviating hand discomfort when the user operates the conventional notebook computer. Further, the portable electronic devices can have an additional dissipation space to improve the problem of heat dissipation caused by compactness of the portable electronic device. The portable electronic device according to another embodiment may be disposed with a foot pad in the housing. By abutting against the bottom cover and the foot pad by the lift structure, the housing is lifted to form an angle conforming with the ergonomics of the user. Therefore, the user's hands can operate the portable electronic device of the embodiment in an ergonomic manner, and thereby alleviating hand discomfort when the user operates the conventional notebook computer. In another embodiment, the portable electronic device may be disposed with the foot pad on the end surface of the bottom cover opposite to the accommodation space. In another embodiment, the portable electronic device may further include a keyboard, and thereby alleviating hand discomfort when the user operates the keyboard of the conventional notebook computer.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
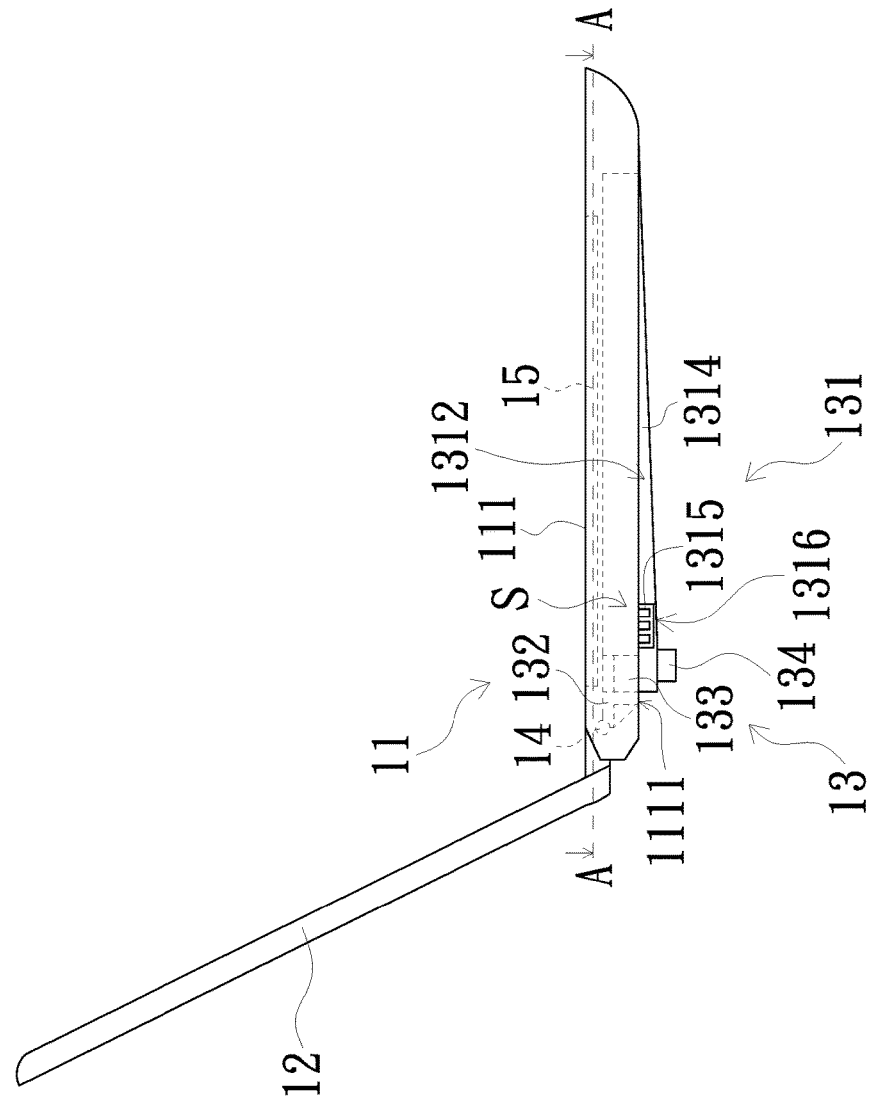
FIG. 1 is a schematic side view of a portable electronic device in accordance with an embodiment of the present invention.
Figure 2:
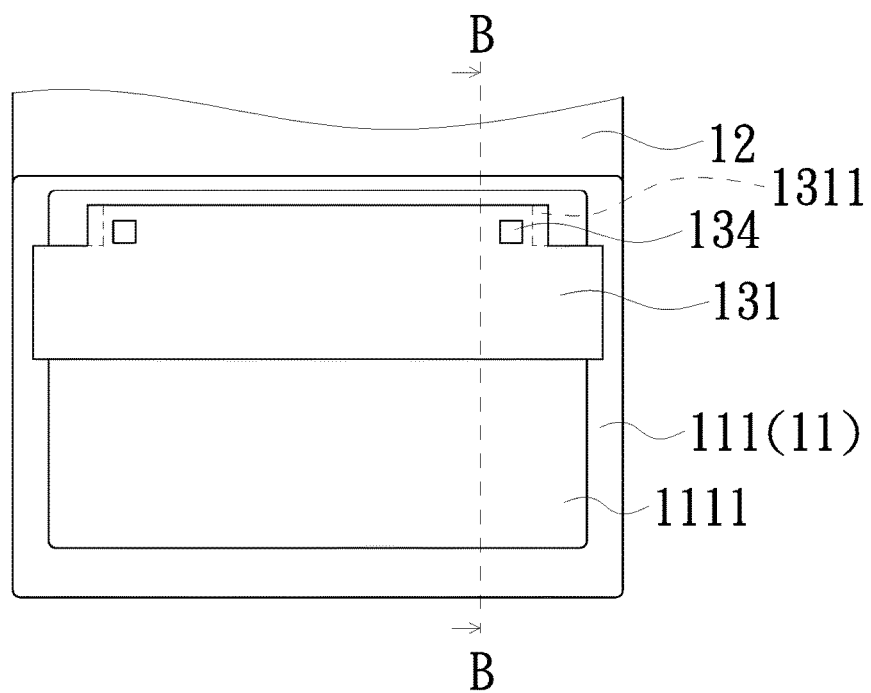
FIG. 2 is a bottom view of the portable electronic device shown in FIG. 1.

FIG. 1 is a schematic side view of a portable electronic device in accordance with an embodiment of the present invention. FIG. 2 is a bottom view of the portable electronic device shown in FIG. 1. As shown in FIGS. 1 and 2, the portable electronic device 1 of the present embodiment is, for example, a notebook computer, but the present embodiment is not limited thereto. The portable electronic device may be a mobile phone, a tablet computer or a personal digital assistant (PDA).

The portable electronic device 1 of the present embodiment includes a host module 11, a display module 12 and a lift structure 13. The host module 11 includes a housing 111. In general, the housing 111 is disposed with a board including electronic components, such as processor, memory, various functional chips and various types of passive elements, therein, which is the main heat source of the whole portable electronic device 1. The housing 111 has an accommodation space S; and the accommodation space S has an opening located, for example, on a bottom surface 1111 of the housing 111.

The display module 12 is, for example, a liquid crystal display, a light emitting diode display or other types of displays. Since the portable electronic device 1 is generally designed in the form of a foldable configuration, the display module 12 is pivotally connected to the housing 111 via a shaft 14. In other words, the shaft 14 is disposed between the housing 111 and the display module 12, so that the display module 12 can be pivoted with respect to the host module 11.

The lift structure 13 is disposed to the housing 111. Specifically, the lift structure 13 is disposed inside the housing 111 and on the bottom surface 1111. The lift structure 13 is moved on the bottom surface 1111 of the housing 111 according to the rotation of the display module 12 with respect to the host module 11, and thereby lifting the side of the housing 111 adjacent to a position at which the host module 11 is pivotally connected to the display module 12. However, the position at which the housing 111 is lifted is not limited to those shown in FIGS. 1 and 2.

The structures and connection relationships of a bottom cover 131, a swing member 132 and a follower member 133 included in the lift structure 13 of the present embodiment will be described below.

Figure 3:
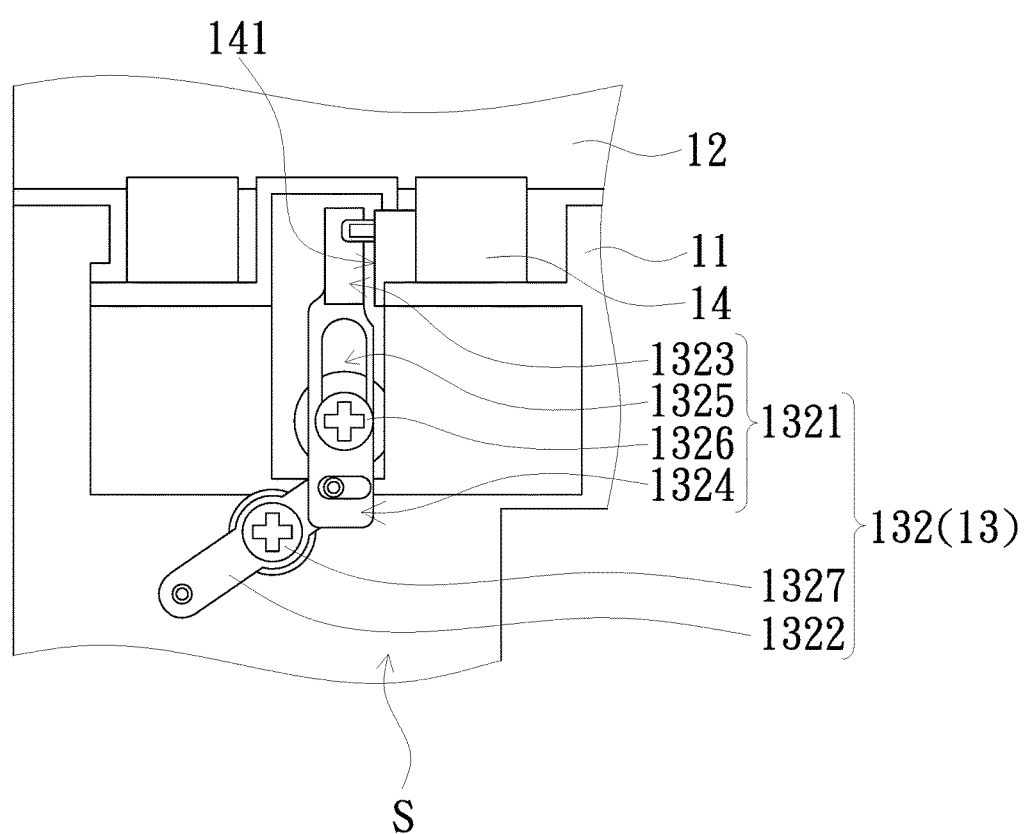
FIG. 3 is a schematic cross-sectional view of the portable electronic device, taken along the line A-A in FIG. 1.
Figure 4:
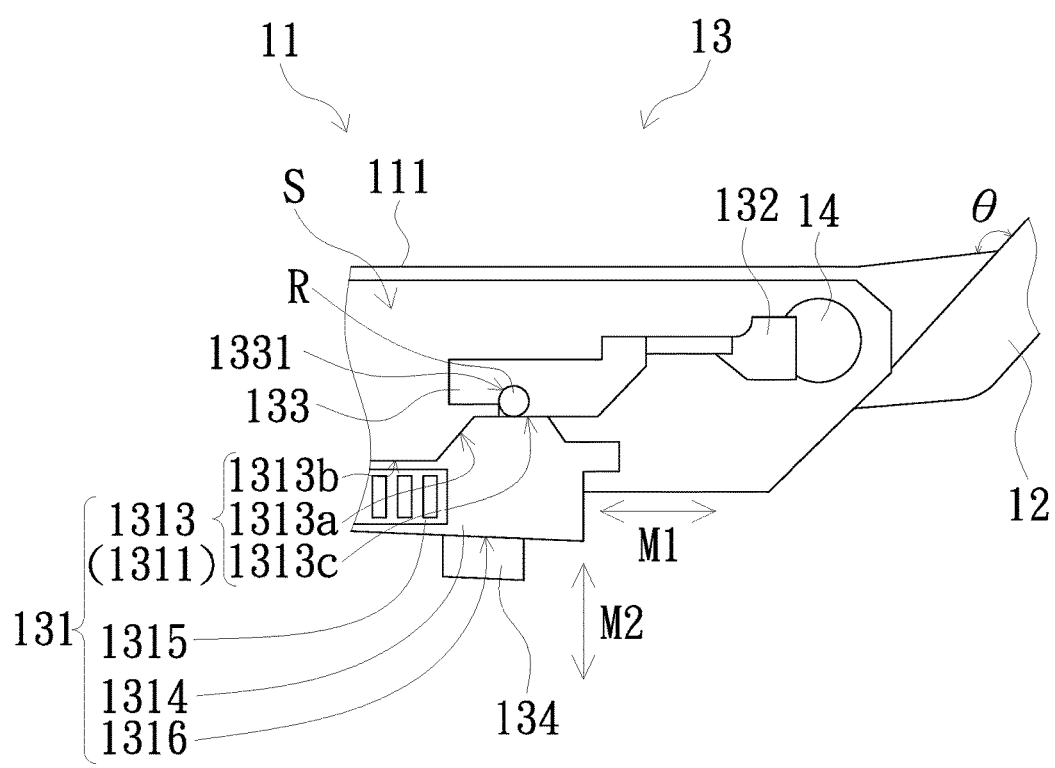
FIG. 4 is a schematic cross-sectional view of the portable electronic device, taken along the line B-B in FIG. 2.

FIG. 3 is a schematic cross-sectional view of the portable electronic device, taken along the line A-A in FIG. 1. FIG. 4 is a schematic cross-sectional view of the portable electronic device, taken along the line B-B in FIG. 2. As shown, the bottom cover 131 of the present embodiment covers the accommodation space S from the bottom surface 1111 of the housing 111. The bottom cover 131 includes an abutment portion 1311. The abutment portion 1311 is located on an end surface 1312 of the bottom cover 131 adjacent to the accommodation space S. The abutment portion 1311 has a first abutment surface 1313. As shown in FIG. 2, the quantity of abutment portions 1311 is two for example, and the two abutment portions 1311 are arranged on the bottom surface 1111 of the housing 111. However, the present embodiment does not limit the quantity of abutment portions 1311, and the quantity of abutment portions 1311 may be one or more than two according to the actual design requirements.

The bottom cover 131 includes, for example, one or more retaining walls 1314 extending in a second direction M2. The retaining wall 1314 surrounds the edge of the end surface 1312 of the bottom cover 131 and extends towards the accommodation space S. The retaining wall 1314 is for closing the gap between the lifted housing 111 and the bottom cover 131. In addition, the retaining wall 1314 also has, for example, a grid 1315. The grid 1315 of the retaining wall 131 is exposed to a side of the housing 111 when the housing 111 is lifted up by the bottom cover 131. The grid 1315 serves as an opening allowing the air required for cooling the components in the host module 11 to flow in or out.

In addition, the portable electronic device 1 of the present embodiment may be disposed with a foot pad 134. The foot pad 134 is disposed on the other end surface 1316 of the bottom cover 131 and, for example, adjacent to the position at which the host module 11 is pivotally connected to the display module 12. The foot pad 134 is disposed below the bottom cover 131, so that the foot pad 134 is moved with the bottom cover 131. In other embodiments, the portable electronic device 1 may not be disposed with the foot pad 134.

The swing member 132 of the present embodiment is disposed in the accommodation space S. The swing member 132 is connected to an end surface 141 of the shaft 14, and therefore, the swing member 132 is moved together with the display module 12. In other words, the accommodation space S of the housing 111 is disposed with the swing member 132, the end surface 141 of the shaft 14 is located in the accommodation space S, and the end surface 141 is connected to the swing member 132. When the display module 12 is rotated, the swing member 132 produces a swing according to the rotation of the display module 12.

In the present embodiment, the swing member 132 includes, for example, a guide portion 1321 and a swing arm 1322. For example, the guide portion 1321 and the swing arm 1322 are a set of connecting rod. A first end portion 1323 of the guide portion 1321 is connected to the end surface 141 of the shaft 14, and a second end portion 1324 of the guide portion 1321 is pivotally connected to the swing arm 1322. The guide portion 1321 is moved according to the rotation of the display module 12, and the swing arm 1322 is swung according to the movement of the guide portion 1321.

The guide portion 1321 includes, for example, a slot 1325 and a stopper member 1325. The slot 1325 has an elongated shape, for example. The slot 1325 is located between the first end portion 1323 and the second end portion 1324. The stopper member 1326 is disposed through the slot 1325 and fixed to the housing 111. In FIG. 3, the stopper member 1326 is fixed to the housing 111 to cooperate with the motion path of the slot 1325. The slot 1325 is placed on the stopper member 1326 and moved with respect to the stopper member 1326 according to the rotation of the display module 12. That is, the slot 1325 of the guide portion 1321 is limited by the stopper member 1326, so that the guide portion 1321 can only be moved along the stopper member 1326.

The second end portion 1324 of the guide portion 1321 is pivotally connected to one end of the swing arm 1322, and the other end of the swing arm 1322 is pivotally connected to the follower member 133. In addition, the swing member 132 further includes, for example, a pivot 1327, which is also fixed to the housing 111. In FIG. 3, the middle part of the swing arm 1322 is pivotally connected to the pivot 1327, so that the swing arm 1322 can be pivoted about the pivot 1327 and the two end of the swing arm 1322 are swung in the opposite direction. In other words, the follower member 133 and the guide portion 1321 are moved in the opposite direction.

The follower member 133 of the present embodiment is, for example, disposed in the housing 111, connected to the swing member 132, and contacts and abuts against the first abutment surface 1313 of the abutment portion 1311. The first abutment surface 1313 may further has a slope surface 1313a and two flat surfaces 1313b, 1313c connected to the slope surface 1313a. One side of the follower member 133 with respect to the first abutment surface 1313 has, for example, a first abutment against surface 1331. The first abutment against surface 1331 contacts and abuts against the first abutment surface 1313. Specifically, the first abutment against surface 1331 may contact at least one of the slope surface 1313a, the flat surface 1313b and the flat surface 1313c, so that the first abutment against surface 1331 abuts against the first abutment surface 1313. In addition, the first abutment against surface 1331 may contact and abut against the two adjacent connecting surfaces (e.g., the slope surface 1313a and the flat surface 1313b, or the slopes surface 1313a and the flat surface 1313c) at the same time.

In the present embodiment, the follower member 133 is disposed with a roller R, for example, on a side thereof adjacent to the bottom cover 131. The roller R has, for example, a cylindrical shape, and the ring side of the roller R is the first abutment against surface 1331. The follower member 1331 is moved in a first direction M1 according to the swinging of the swing member 132; therefore, the roller R of the follower member 133 abuts against the first abutment surface 1313 and the bottom cover 131 is moved in the second direction M2 to lift up the housing 111 at the position at which the host module 11 is pivotally connected to the display module 12. The roller R may be moved in the first direction M1 without being rotated. However, the roller R may be pivotally disposed on the side of the follower member 133 adjacent to the bottom cover 131 according to the design requirements so that the roller R can be moved and rotated in the first direction M1.

In addition, the follower member 133 of the present embodiment is not limited to FIG. 4. That is, the follower member 133 may not include the roller R, and the follower member 133 forms the first abutment against surface 1331 on the side thereof adjacent to the bottom cover 131. For example, the first abutment against surface 1331 is, for example, a plurality of connecting surfaces (e.g., any combination of flat surfaces, slope surfaces or curved surfaces) with respect to the first abutment surface 1313, and the first abutment against surface 1331 contacts and abuts against the first abutment surface 1313.

The portable electronic device 1 of the present embodiment may provide, for example, a plurality of stages of operation. That is, while the user rotates the display module 12, the relative position of the follower member 133 and the bottom cover 131 is designed according to the change in angle θ (e.g., 0, 20, 80 or 135 degrees) of the rotation of the display module 12 with respect to the host module 11. However, the present embodiment does not limit the range of the angle θ, and the angle θ may vary according to the actual requirements.

Figure 5A:
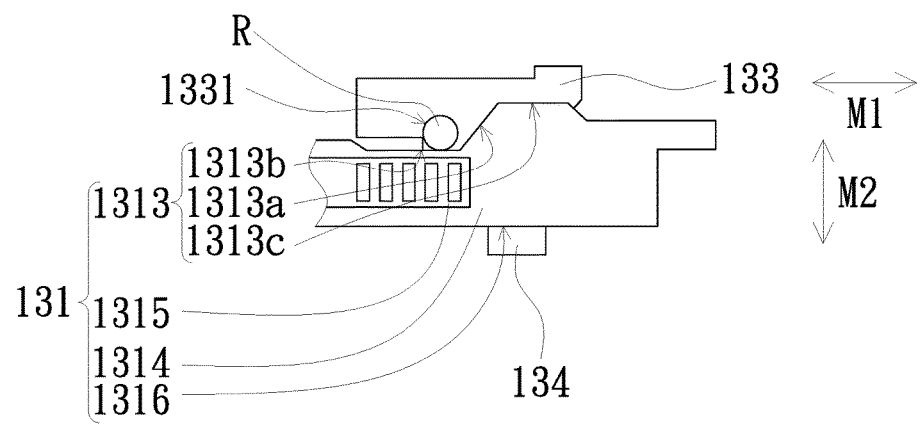
FIGS. 5A to 5D are schematic illustrations of the stages of operation of the follower member and bottom cover in FIG. 1.
Figure 5B:
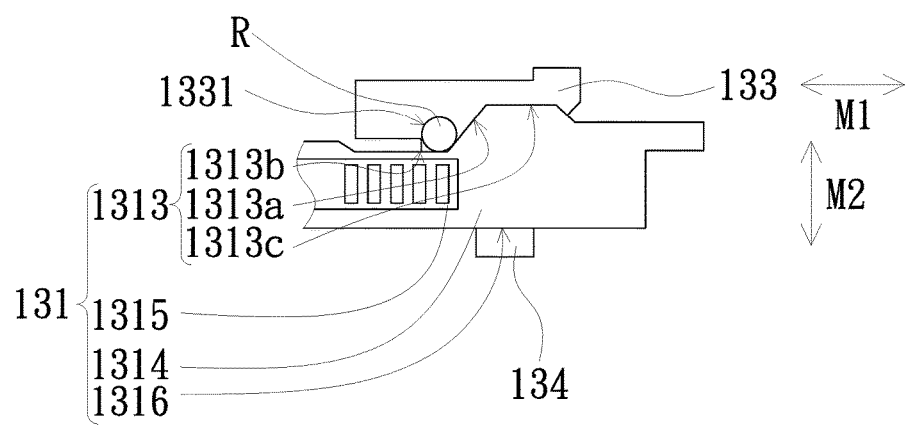
Figure 5C:
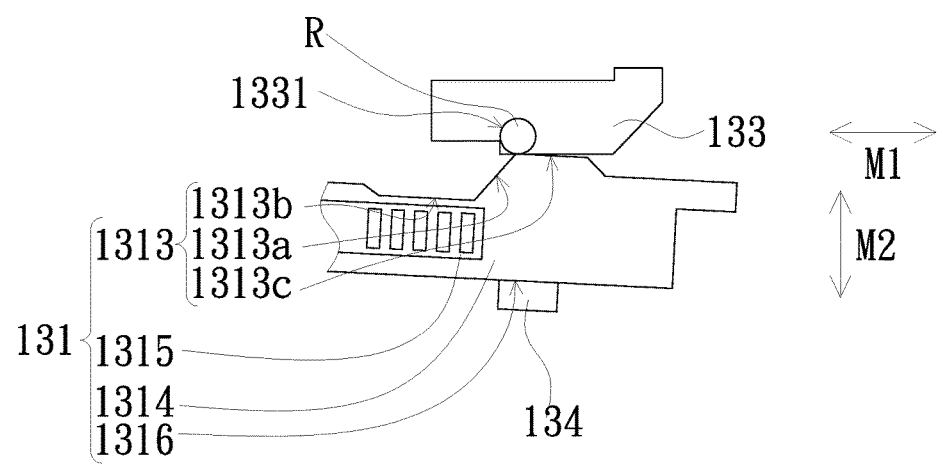
Figure 5D:
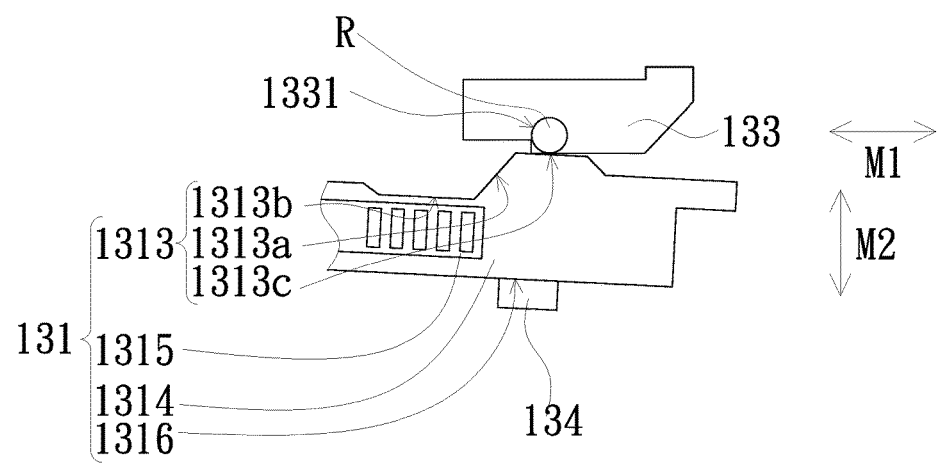

FIGS. 5A to 5D are schematic illustrations of the stages of operation of the follower member and bottom cover in FIG. 1. Referring to FIGS. 4 and 5A to 5D. As shown in FIG. 5A, when the angle θ of rotation of the display module 12 with respect to the host module 11 is 0 degrees, the first abutment against surface 1331 of the follower member 133 contacts the flat surface 1313b of the first abutment surface 1313. Then, as shown in FIG. 5B, when the angle θ is increased from 0 degrees to 20 degrees, the follower member 133 is moved in the first direction M1 to between the flat surface 1313b and the slope surface 1313a according to the swinging of the swing member 132. Then, as shown in FIG. 5C, when the angle θ is increased from 20 degrees to 80 degrees, the follower member 133 is moved in the first direction M1 to pass through the slope surface 1313a, and at the same time the follower member 133 abuts against the slope surface 1313a of the bottom cover 131, thereby moving the bottom cover 131 in the second direction M2 until the follower member 133 contacts the flat surface 1313c and the bottom cover 131 stops moving in the second direction M2. Then, as shown in FIG. 5D, when the angle θ is increased from 80 degrees to 135 degrees, the follower member 133 continues to move in the first direction M1 on the flat surface 1313c, and the bottom cover 131 is no longer moved.

Therefore, the portable electronic device 1 of the present embodiment abuts against the bottom cover 131 by the follower member 133 of the lift structure 13 and is adapted to lift up the side of the housing 111 adjacent to the position at which the host module 11 is pivotally connected to the display module 12, so as to conform to the ergonomic angle of the user's hands. Therefore, the user's hands can operate the portable electronic device 1 of the present embodiment in an ergonomic manner and further the portable electronic device 1 can have an additional dissipation space.

Figure 6:
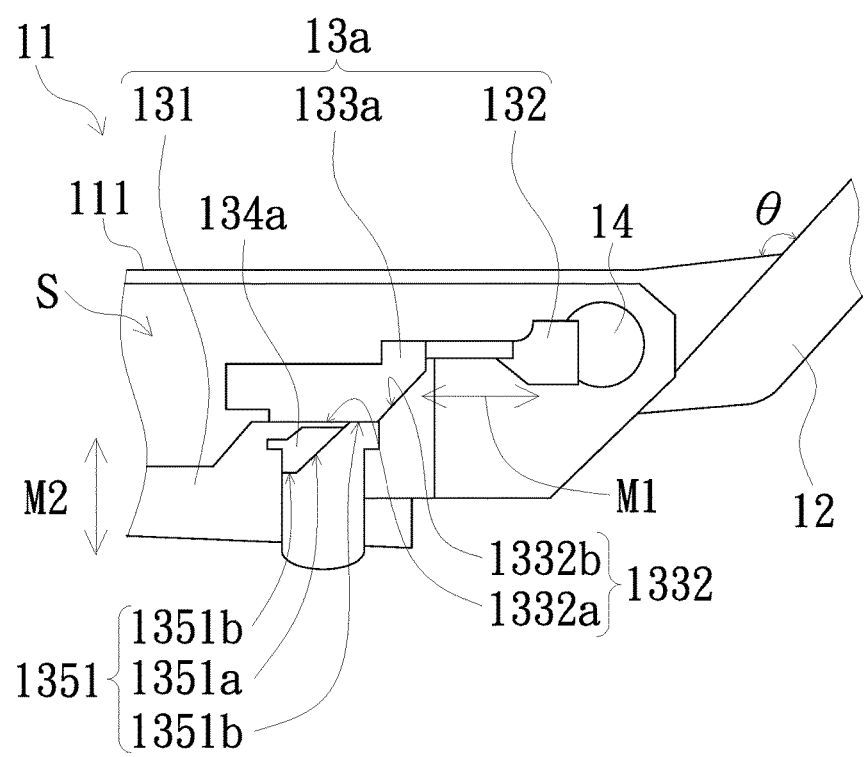
FIG. 6 is a schematic side view of a portable electronic device in accordance with an embodiment of the present invention.

FIG. 6 is a schematic side view of a portable electronic device in accordance with another embodiment of the present invention. As shown in FIG. 6, the portable electronic device 1a of the present embodiment is similar to that of FIG. 4, except that in the embodiment the foot pad 134a of the lift structure 13a is disposed in the housing 111 and the follower member 133a also contacts the foot pad 134a. Therefore, the follower member 133a is moved in the first direction M1 to drive the foot pad 134a to move in the second direction M2, thereby assist the housing 111 to move in the second direction M2 and be lifted up. In addition, the quantity of foot pads 134a is two, for example. However, the present embodiment does not limit the quantity of foot pads 134a, and the quantity of foot pads 134a may be one or more than two according to the design requirements.

Further, one side of the foot pad 134a has, for example, a second abutment surface 1351. The second abutment surface 1351 includes a slope surface 1351a and two flat surfaces 1351b, 1351c connected to the slope surface 1351a. The side of the follower member 133a opposite to the second abutment surface 1351 has, for example, a second abutment against surface 1332. The second abutment against surface 1332 includes, for example, a flat surface 1332a and a slope surface 1332b connected to each other. The second abutment against surface 1332 contacts and abuts against the second abutment surface 1351, and the second abutment against surface 1332 and the first abutment against surface 1331 may be located on the opposite side of the follower member 133a.

Figure 7A:
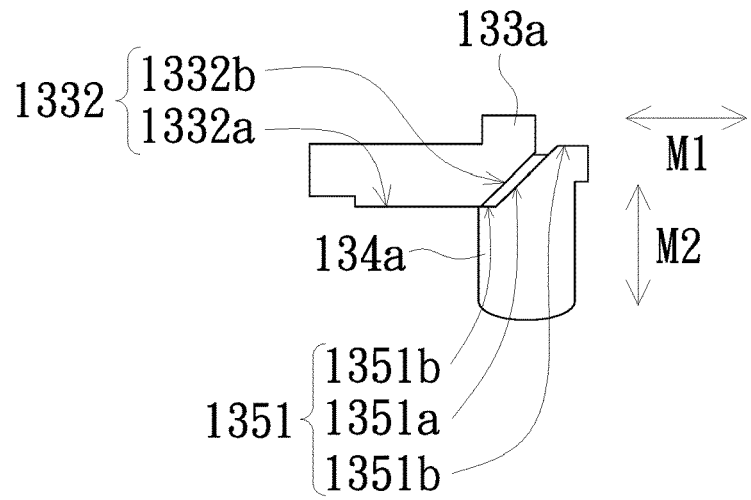
FIGS. 7A to 7D are schematic illustrations of the stages of operation of the follower member and foot pad in FIG. 6.
Figure 7B:
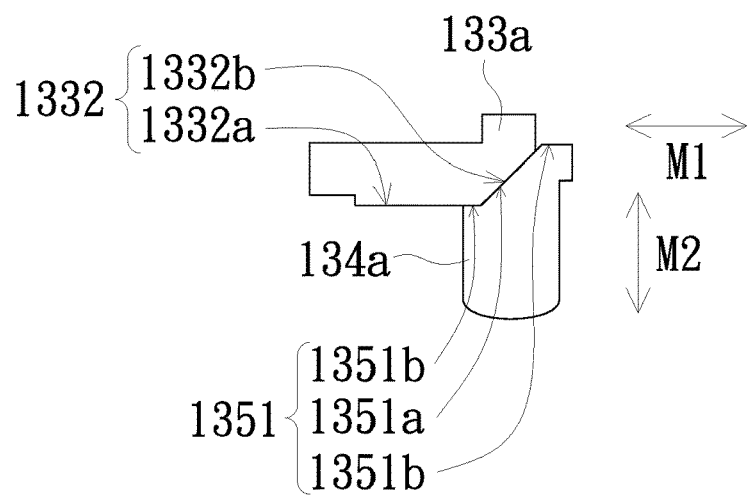
Figure 7C:
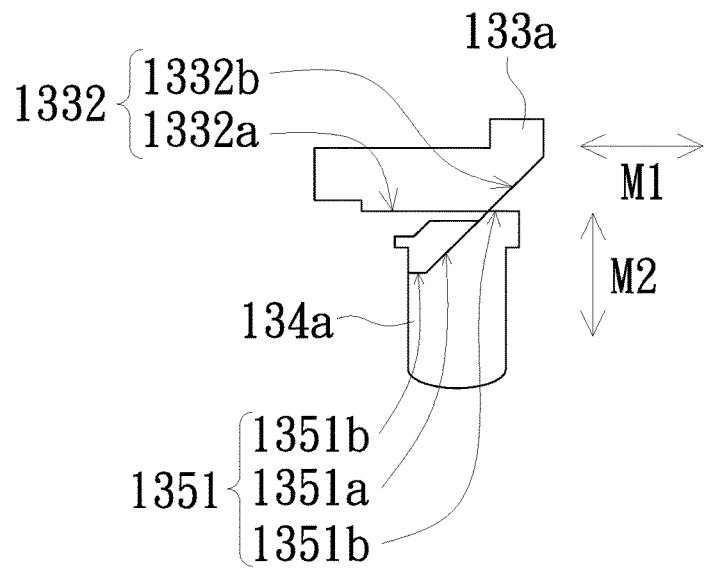
Figure 7D:
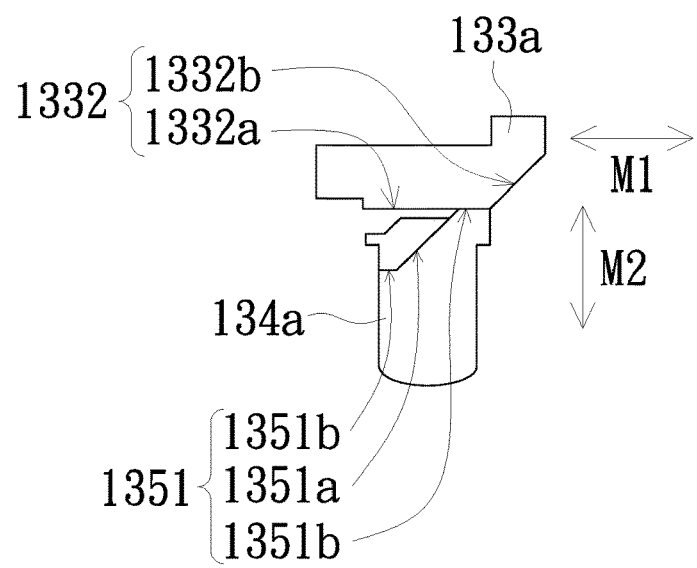

The foot pad 134a of the present embodiment has, for example, the same stages of operation as the bottom cover 131; that is, the foot pad 134a and the bottom cover 131 are simultaneously abutted against by the follower member 133a. To simply the description of the present embodiment, only the stages of operation of the foot pad 134a is described herein. FIGS. 7A to 7D are schematic illustrations of the stages of operation of the follower member and foot pad in FIG. 6. Referring to FIGS. 6 and 7A to 7D. As shown in FIG. 7A, when the angle θ of rotation of the display module 12 with respect to the host module 11 is 0 degrees, the flat surface 1332a of the second abutment against surface 1332 contacts the flat surface 1351b of the second abutment surface 1351. Then, as shown in FIG. 7B, when the angle θ is increased from 0 degrees to 20 degrees, the flat surface 1332a and the slope surface 1332b of the second abutment against surface 1332 are moved in the first direction M1 to contact the flat surface 1351b and the slope surface 1351a of the second abutment surface 1351 according to the swinging of the swing member 132; that is, the second abutment against surface 1332 is overlapped with the second abutment surface 1351. Then, as shown in FIG. 7C, when the angle θ is increased from 20 degrees to 80 degrees, the follower member 133a is moved in the first direction M1 to pass through the slope surface 1351a of the bottom cover 131, and at the same time the slope surface 1351a is moved in the second direction M2 until the follower member 133a contacts the flat surface 1351c and the bottom cover 131 stops moving in the second direction M2. Then, as shown in FIG. 7D, when the angle θ is increased from 80 degrees to 135 degrees, the follower member 133a continues to move in the first direction M1 on the flat surface 1351c, and the bottom cover 131 is no longer moved. In addition, the foot pad 134a of the present embodiment may be designed to have stages of operations different from the bottom cover 131 has.

Therefore, in the portable electronic device 1a of the present embodiment, the bottom cover 131 and the foot pad 134a are abutted against by the follower member 133a of the lift structure 13a and the side of the housing 111 adjacent to the position at which the host module 11 is pivotally connected to the display module 12 is lifted, so as to conform to the ergonomic angle of the user's hands and increase the dissipation space. Therefore, the user's hands can operate the portable electronic device 1a of the present embodiment in an ergonomic manner and the portable electronic device 1a can have a compact design.

It is to be noted that the portable electronic device 1 of the above-described embodiment may further include a keyboard 15 disposed on the upper surface of the housing 111. As the bottom cover 131 can lift up one side of the housing 111, the user's hands can operate the keyboard 15 of the portable electronic device 1 of the present embodiment in an ergonomic manner, and thereby alleviating hand discomfort when the user operates the keyboard of the conventional notebook computer.

In summary, in the portable electronic device according to an embodiment of the present invention, the follower member of the lift structure is moved in the first direction according to the swinging of the swing member and therefore abuts against the first abutment surface, so that the bottom cover is moved in the second direction to lift up the housing to form an angle conforming with the ergonomics of the user. Therefore, the user's hands can operate the portable electronic device of the present embodiment in an ergonomic manner, and thereby alleviating hand discomfort when the user operates the conventional notebook computer. Further, the portable electronic devices have an additional dissipation space to improve the problem of heat dissipation caused by compactness of the portable electronic device. The portable electronic device according to another embodiment may be disposed with a foot pad in the housing. By abutting against the bottom cover and the foot pad by the lift structure, the housing is lifted to form an angle conforming with the ergonomics of the users. Therefore, the user's hands can operate the portable electronic device of the embodiment in an ergonomic manner, and thereby alleviating hand discomfort when the user operates the conventional notebook computer. In another embodiment, the portable electronic device may be disposed with the foot pad on the end surface of the bottom cover opposite to the accommodation space. In another embodiment, the portable electronic device may further include a keyboard, and thereby alleviating hand discomfort when the user operates the keyboard of the conventional notebook computer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device, comprising:
    a host module, comprising a housing, wherein the housing comprises an accommodation space;
    a display module, pivotally connected to the housing by a shaft; and
    a lift structure, comprising:
        a bottom cover, for covering the accommodation space from a bottom surface of the housing, wherein the bottom cover comprises an abutment portion located on a first end surface of the bottom cover adjacent to the accommodation space, and the abutment portion comprises a first abutment surface;
        a swing member, disposed in the accommodation space and connected to the shaft, wherein the swing member is moved together with the display module; and
        a follower member, connected to the swing member and contacting the first abutment surface, wherein the follower member is moved in a first direction according to a swinging of the swing member, so that the follower member abuts against the first abutment surface and the bottom cover is moved in a second direction to lift up the housing, the swing member has a guide portion, a swing arm and a pivot, the pivot is fixed to the housing, the guide portion is pivotally connected to an end of the swing arm, the follower member is pivotally connected to another end of the swing arm, and a middle part of the swing arm is pivotally connected to the pivot.

2. The portable electronic device according to claim 1, wherein the first abutment surface comprises a slope surface and two flat surfaces connected to the slope surface.

3. The portable electronic device according to claim 1, wherein a side of the follower member comprises a first abutment against surface opposite to the first abutment surface, and the first abutment against surface contacts and abuts against the first abutment surface.

4. The portable electronic device according to claim 1, wherein the lift structure further comprises a foot pad disposed on a second end surface of the bottom cover.

5. The portable electronic device according to claim 1, wherein the lift structure further comprises a foot pad disposed on the housing, the follower member contacts the foot pad, and the follower member is moved in the first direction to drive the foot pad to move in the second direction to lift up the housing.

6. The portable electronic device according to claim 5, wherein a side of the foot pad comprises a second abutment surface, and the second abutment surface comprises a slope surface and two flat surfaces connected to the slope surface.

7. The portable electronic device according to claim 6, wherein a side of the follower member comprises an abutment against surface opposite to the second abutment surface, and the abutment against surface contacts the second abutment surface.

8. The portable electronic device according to claim 1, wherein a first end portion of the guide portion is connected to the shaft, a second end portion of the guide portion is pivotally connected to the swing arm, the guide portion is moved according to a rotation of the display module, and the swing arm is swung according to a movement of the guide portion.

9. The portable electronic device according to claim 8, wherein the guide portion comprises a slot and a stopper member, the slot is located between the first end portion and the second end portion, the first stopper member passes through the slot and is fixed to the housing, and the slot is moved with respect to the stopper member according to the rotation of the display module.

10. The portable electronic device according to claim 8, wherein the second end portion of the guide portion is pivotally connected to a first end of the swing arm.

11. The portable electronic device according to claim 1, wherein the host module comprises a keyboard disposed on an upper surface of the housing.

12. The portable electronic device according to claim 1, wherein the bottom cover comprises at least one retaining wall extending in the second direction to dose a gap between the lifted housing and the bottom cover, and the retaining wall comprises a grid.

\* \* \* \* \*